Oct. 14, 1952          J. D. EISLER          2,613,449

PENDULUM DAMPING DEVICE FOR ELEVATION METERS

Filed Aug. 31, 1945          2 SHEETS—SHEET 1

INVENTOR:
Joseph D. Eisler
BY
Attorney

Oct. 14, 1952  J. D. EISLER  2,613,449
PENDULUM DAMPING DEVICE FOR ELEVATION METERS
Filed Aug. 31, 1945  2 SHEETS—SHEET 2

INVENTOR:
Joseph D. Eisler
BY L. D. Goodwin
Attorney

Patented Oct. 14, 1952

2,613,449

UNITED STATES PATENT OFFICE 2,613,449

PENDULUM DAMPING DEVICE FOR ELEVATION METERS

Joseph D. Eisler, Tulsa, Okla., assignor to Stanolind Oil and Gas Company, Tulsa, Okla., a corporation of Delaware Application August 31, 1945, Serial No. 613,824

5 Claims. (Cl. 33—220)

1

This invention pertains to the art of damping of an oscillating member. More particularly, it pertains to the art of damping a pendulum where such pendulum is supported on an oscillating or moving vehicle. The most important application is therefore in the arts of gradient and differential elevation determination in which a pendulum is employed as a reference to obtain the slope of a path over which a vehicle travels.

It is well known that a freely suspended pendulum will oscillate when the pendulum support is accelerated or decelerated. It is also well known that a pendulum which is carried by a moving vehicle will tend to oscillate irrespective of ordinary accelerations or decelerations of the support along the path of the vehicle. In other words, the pendulum may be caused to oscillate even by an acceleration normal to the path over which the vehicle is traveling, especially when such acceleration happens at an instant when a line through the center of gravity of the pendulum and its center of suspension is not normal to the path.

Various means have been proposed to compensate for the displacement of a pendulum from the vertical, i. e., from a point where a line through the center of gravity of the pendulum and its axis of rotation is absolutely vertical, due to accelerations and decelerations of the support in the direction of travel. Such compensation has in general proved satisfactory for the specified purpose. I have found, however, that even with compensation for acceleration and deceleration along the path of the vehicle carrying the pendulum, due to vertical accelerations and decelerations or other fluctuations of the vehicle, the pendulum, particularly a pendulum mounted on low friction pivots, will tend to oscillate about its axis of rotation. It is necessary to damp such oscillations, particularly on a gradiometer or elevation meter, so that a plot of the path will truly represent the path and so that a follower mechanism will be able to follow the excursion of the pendulum.

It is desirable to damp the pendulum internally, i. e., without the use of external forces. Internal damping, however, appears impractical so external damping has been employed. "Damp" or "damping" as the terms are used herein refers to the resistance forces, such as accompany eddy currents in a metallic member as it is moved in a magnetic field, applied to a vibrating member, which resistance forces are proportional to the relative velocity between the vibrating member and the restraining member. The terms specifically include all cases in which appreciable work or energy is dissipated and the vibrations are diminished progressively. Various means have been proposed to damp externally an oscillating member on a traveling support. For example, it has been proposed to mount a metallic disk on

2 the axis of the pendulum. Permanent magnets are then mounted on the support and coact with said disk to damp electromagnetically the oscillations of the pendulum. It has also been proposed to place friction members on the pendulum which coact with the support to damp the oscillations of the pendulum. Furthermore, it has been proposed to suspend the pendulum in a viscous fluid to damp the oscillations thereof. All of these proposals, however, have the same characteristic, viz., the tendency for the support to rotate the pendulum, which tends to make their use impractical in situations where it is necessary that the pendulum be unaffected by motions of the support. Thus, with the first-mentioned electromagnetic means a rotational oscillation of the support about the axis of suspension of the pendulum would tend to rotate the pendulum, and in applications such as gradiometers or elevation meters this rotational effect on the pendulum introduces errors which are undesirable, particularly when an accurate survey is required.

It is therefore an object of this invention to provide an improved pendulum damping means which will as nearly as practical be equivalent to an internal damping means. It is a further object of this invention to provide a dynamic damping means for a pendulum. A still more specific object of this invention is to provide dynamic damping means for a pendulum whereby the pendulum will not be affected by oscillations of the support. A still further object of this invention is to provide an electromagnetic damping means for a pendulum used on an elevation meter whereby the rotational oscillations of the vehicle carrying the pendulum about the pendulum will not be transmitted to the pendulum. Other objects and advantages of the invention will become apparent as the description thereof proceeds.

This invention may be described generally, therefore, as an apparatus for damping the oscillations of a pendulum mounted on a traveling support in which the damping means is rotatably mounted on the support on the axis of the pendulum whereby rotation of the support about the axis of support of the pendulum will not be transmitted to the pendulum.

The accompanying drawings are illustrations of certain embodiments of my invention and are included for the purpose of explaining the operation of the invention as applied to an elevation meter. However, the invention finds application in other arts in which an oscillating member is mounted on a moving support. In these drawings which form a part of this specification and are to be read in conjunction therewith, the same reference numerals in the various figures refer to the same or corresponding parts. In these figures.

Figure 1:
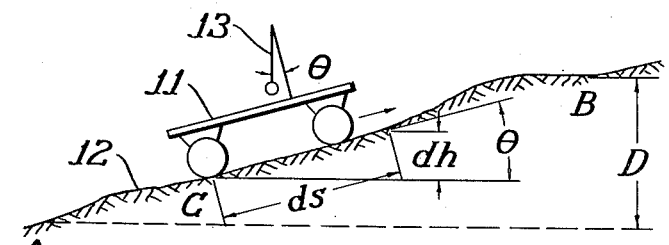
Figure 1 is a diagram of the geometric quantities involved in the explanation of this invention.

In Figure 1 a vehicle 11 is shown on a certain path 12 between points A and B, between which points the difference in elevation is to be determined. This difference in elevation is the distance D as shown. The total length of the path from A to B is a certain distance S (not shown). Angle $\theta$ represents the angle of inclination of the path at any point C along the path $\overline{AB}$. It is apparent that the incremental difference in elevation $dh$ between point C and a point an incremental distance $ds$ from C is given by the equation $$dh = ds \sin \theta \qquad (1)$$

The total difference in elevation D between points A and B is given by the equation $$D = \int_A^B \sin \theta \, ds \qquad (2)$$

In other words, the difference in elevation between points A and B is the integral of the product of each increment of distance $ds$ times the sine of the corresponding angle of inclination $\theta$. It is to be noted that in this derivation it makes no difference what the horizontal projection of the path S is. That is, if the vehicle travels from A to B over any path, straight or curved, the total difference in elevation D between the two points A and B must be the same. If a pendulum 13 is mounted on vehicle 11, the angle of inclination of a line perpendicular to the bed of the vehicle relative to the pendulum is given by the angle $\theta$, which is the angle of inclination of the path at that point C.

Figure 2:
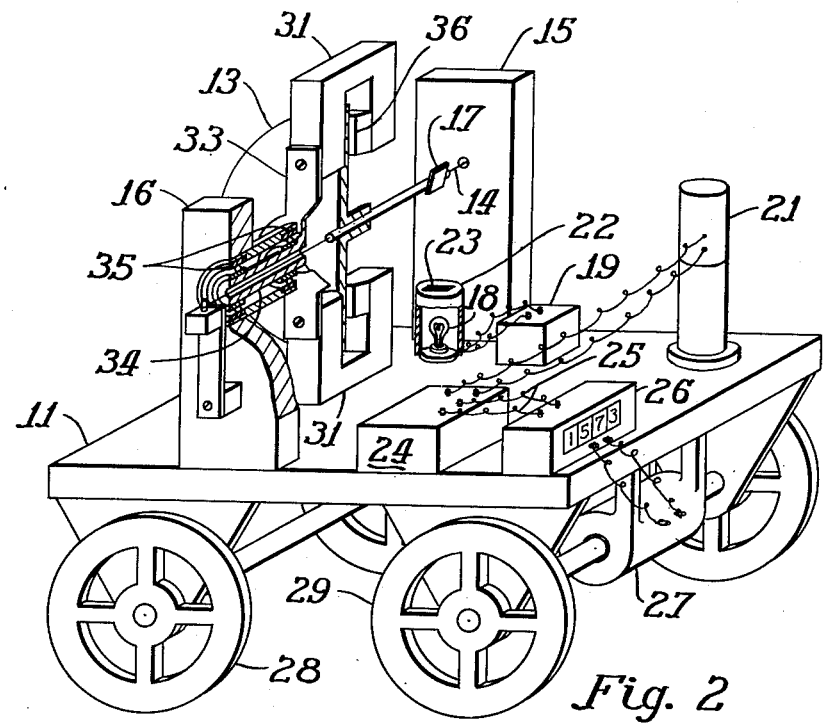
Figure 2 is an oblique view of one embodiment of an elevation meter in which dynamic damping means in accordance with this invention are employed in conjunction with a disk pendulum.

One form of apparatus for integrating the product of the increment of distance traveled times the sine of the angle of inclination of the path is shown in Figure 2. Here the pendulum 13 consists of a plate, preferably a circular disk, which is mounted on torsion fiber 14 at a point on the disk some distance from the center of gravity of the disk. The pendulum may be pivoted on a low friction bearing, e. g., a jeweled bearing. I prefer, however, a torsion fiber 14 which suspends the pendulum between the two supports 15 and 16 that are in turn carried by the vehicle 11. A small mirror 17 is mounted on the axis of the pendulum 13. Light from a uniform source, such as lamp 18, which is energized by a battery 19, is focused on mirror 17 and reflected towards a photoelectric cell 21. A light shield 22 having a narrow slot 23 in the top thereof directs a narrow beam of light from lamp 18 to photoelectric cell 21. The lamp 18 and photoelectric cell 21 are so positioned and the elasticity of torsion fiber 14 is so adjusted that the amount of light which reaches the photoelectric cell is directly related to the angle $\theta$ as indicated in Figure 1. Preferably the lamp and photoelectric cell are positioned so that when the path of the vehicle is horizontal, one-half of the narrow beam of light enters the lower portion of the photoelectric cell. An upward inclination of the path 12 when the instrument is traveling away from the observer then increases the amount of light entering the photoelectric cell, and likewise the downward inclination of the path 12 decreases the amount of light entering the photoelectric cell. Accordingly the direct current output of the photoelectric cell is directly related at all times to the angle of inclination of the vehicle 11.

The output of the photoelectric cell 21 is amplified by an amplifier 24 which produces an output current in the leads 25 proportional to the inclination of the path at the point under consideration. This current is impressed across the current coils of an indicating or recording watt-hour meter 26. An electric generator, preferably a direct current generator 27, is coupled either directly or by a linkage means to a wheel of the vehicle. The output voltage of this generator 27 is proportional to the velocity of the vehicle in the direction of travel. This output voltage is impressed across the voltage coils of the watt-hour meter 26. As is well known, the indicated reading R of this meter is given by expression $$R = \int_{t_1}^{t_2} EI \, dt \qquad (3)$$

in which E is the voltage across the potential coils, I is the current in the current coils, and $dt$ is an increment of time. In this case the difference in time $(t_2 - t_1)$ is the time required to travel the path 12 as indicated in Figure 1 between the two points A and B. The voltage E is proportional to the velocity of the vehicle along the path 12 and, hence, is given by the equation $$E = K_1 \frac{ds}{dt} \qquad (4)$$

where $K_1$ is a constant of proportionality. The current I is proportional to the illumination of the photoelectric cell 21. But for the torsional force in the torsion fiber 14, with the arrangement shown in Figure 2 this illumination is related to twice the angle of inclination $\theta$ as is obvious from the geometry of the construction, and therefore the equation for the current I would be $$I = K_2(2\theta)$$

where $K_2$ is a constant of proportionality. By selecting a torsion fiber 14 having a restoring torque which will cause the pendulum 13 to rotate through an angle of $\frac{1}{2}\theta$ the current I produced by photoelectric cell 21 becomes $$I = K_2 \theta \qquad (5)$$

Substituting the values for E and I from the Equations 4 and 5 in Equation 3 the watt-hour meter reading R becomes $$R = K_1 K_2 \int_{t_1}^{t_2} \frac{ds}{dt} \theta \, dt$$

$$= K_1 K_2 \int_A^B \theta \, ds \qquad (6)$$

For angles of inclination up to and including 10° the sine of the angle is substantially equal to the angle in radians. A self-propelled vehicle is generally limited to slopes of this order. Accordingly, it will be assumed here that the sine of the angle is equal to the angle in radians, and therefore the sine of the angle as used in Equation 2 can be substituted for the angle as used in Equation 6. Thus the apparent output of photoelectric cell 21 which would otherwise be proportional to twice the angle of inclination of the vehicle 11 may be made substantially proportional to the sine of the angle of inclination of the vehicle. Any departure from the true sine of the angle is corrected by shaping slot 23 so that the proper amount of light falls on photoelectric cell 21. Under these conditions it can be seen that the reading R of the watt-hour meter 26 can be substituted for the difference in elevation D, and by combining the constants $K_1$ and $K_2$ into a single constant K Equation 2 becomes $$R = K \int_A^B \sin \theta \, ds \qquad (7)$$

The apparatus containing a photoelectric cell as above described is not adapted to indicate negative angles. That is, the photoelectric cell produces only positive current. Consequently, in the measurement of angles with the photoelectric cell, the angles are always measured as positive current, the photoelectric cell being so constructed and arranged that the angle of zero output is greater than any slope over which the vehicle carrying the elevation meter will pass. For example, the lamp 18, mirror 17 and photoelectric cell 21 might be positioned relative to each other such that when the vehicle is traveling downgrade at an angle of, say, 20°, the output of the photoelectric cell is zero. Under these conditions, when the path is level, the photoelectric cell would have a positive current output of a given value and when the elevation meter is proceeding on the path with an upgrade of, say, 20°, the photoelectric cell output is still positive and quantitatively twice the aforesaid value when the path is level. Thus it will be apparent that an elevation meter employed in an integrating device of the type described in connection with the embodiment of this invention shown in Figure 2 and mounted on a moving vehicle, must be calibrated to obtain an instrument constant. This constant would be the reading of the watt-hour meter had the instrument traveled on a level path between the same points. In order to obtain the actual elevation between two points the instrument constant would therefore be subtracted from the watt-hour meter reading R as set out below in Equation 8. I, therefore, provide means for measuring the distance S between stations A and B and determine the true difference in elevation $dh$ between the two stations A and B from the following equation, $$dh = R - K_3 S \qquad (8)$$

in which $K_3$ is an empirical calibration constant obtained by making a loop or closed traverse, substituting the watt-hour reading for R, 0 for $dh$, and solving Equation 8.

It can thus be seen that my above-described apparatus provides means for determining the angle of inclination of the vehicle, means for measuring the distance traveled by the vehicle, means for continuously multiplying the increments of distance traveled times a quantity substantially directly proportional to the sine of the angle of inclination, and means for integrating the products of this multiplication between points A and B at the ends of the surveyed path.

It will be apparent to those skilled in the art that the pendulum 13 will tend to oscillate about suspension fiber 14 whenever the vehicle 11 tends to rotate about the same point, as for example, when a front wheel 28 or a rear wheel 29 is raised or lowered with respect to the other. That is, suspension fiber 14 having some restoring torque will tend to rotate pendulum 13 whenever the supports 15 and 16 rotate about the fiber. Oscillations thus induced in pendulum 13 tend to continue whether or not the pendulum 13 is supported on a torsion fiber or any other low friction pivot. In the devices of the prior art, damping means have been attached directly to the vehicle 11 or to the supports 15 and 16 as explained above. Such a construction tends to cause undesirable inaccuracies due to the fact that any rotation of the damping means about the center of rotation of the pendulum tends to rotate the pendulum. In accordance with my invention a portion of the damping means is rotatably mounted on the vehicle. That portion which is thus mounted has a very high inertia, i. e., an inertia substantially greater than the inertia of the system being damped, and a very low frictional mounting whereby it will tend to remain in the same position, especially on high frequency oscillations such as cause the most trouble in instruments of this nature. I have shown a damping means in which an electromagnetic means, preferably high inertia permanent magnets 31, are associated or coact directly with the disk pendulum 13. It should, however, be pointed out here that this invention is not limited to the placing of these elements in the position shown; neither is it limited to the use of a disk pendulum, for the disk may be only remotely connected with the pendulum or any other oscillating member. Also, the magnetic elements may be connected to or constitute the oscillating member, and the high inertia element may be connected to or constitute the disk or any other plate. Permanent magnets 31 are mounted on a framework 33 which has a tubular axle 34. This axle is made tubular so that the pendulum suspension torsion fiber 14 may pass through it as indicated. Framework 33 is in turn rotatably mounted on the support 16. Low friction bearings 35 are preferably employed to decrease the tendency of the permanent magnets 31 to rotate with support 16.

The permanent magnets 31 may take any convenient form; however, I prefer that the pole pieces 36 be shaped and placed as indicated. That is, I prefer that the magnetic flux in the gap between the poles of the magnet be concentrated and elongated with the longer axis in a radial direction. The theory of operation for this improvement is not clearly known. However, one explanation may be made on the following basis.

Figure 4:
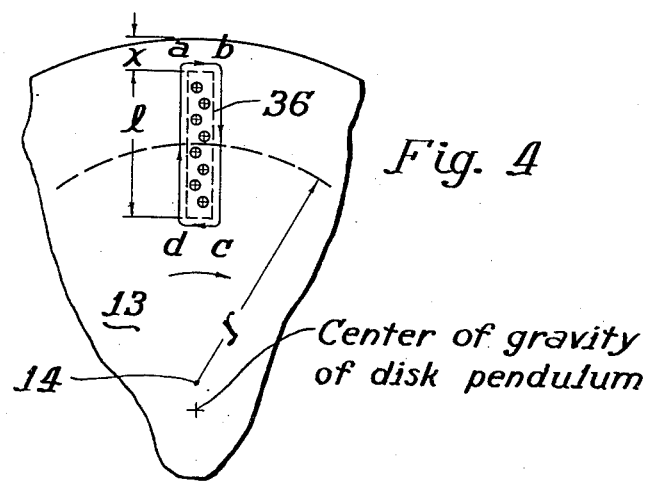
Figure 4 is a diagram used in the explanation of one feature of this invention.

Inasmuch as the arrangement of elements shown in the electromagnetic damping means is in effect a combination generator-motor in which the current $I'$ flowing in the imaginary winding $\overline{abcda}$ (see Fig. 4) and the magnetic flux $\beta$ is the same in both the generator and motor, it can be shown that by combining the motor equation $$T = K_5 \beta l I' r$$

and the generator equation $$E' = K_6 \beta l \omega r$$

that $$T = \frac{K_7 \beta^2 l^2 \omega r^2}{R} \qquad (9)$$

where $E'$ is the voltage output of an electric generator, T is the turning force exerted by each of the damping means, $K_7$ is the product of $K_5$ and $K_6$, constants of proportionality, $l$ is the effective length of the pole pieces perpendicular to the relative motion of the plate and magnets, $\omega$ is the angular velocity of the pendulum with reference to the magnets, $r$ is the distance radially from the axis of the disk to the center of the imaginary current path $\overline{abcda}$, and R is the total resistance of the disk to the flow of current in the imaginary current path $\overline{abcda}$.

Since $$R = \overline{abcda}\rho$$

Equation 9 becomes $$T = \frac{K_7 \beta^2 l^2 \omega r^2}{\overline{abcda}\rho} \tag{10}$$

where $\rho$ is the resistance per unit length of imaginary current path $abcda$. Therefore, assuming that $K_7$, $\beta$, $\omega$, $r$, and $\rho$ are constant, it can be seen that $$T = \frac{l^2}{\overline{abcda}} \tag{11}$$

In other words, the turning force exerted by the damping means increases very rapidly as the effective length of the pole pieces $l$ perpendicular to the relative motion of the plate and magnet increases with respect to the total length of the imaginary current path.

I have found also that the pole pieces should be spaced a substantial distance $x$ from the edge of the disk to increase effectively the quantity $l$.

Figure 3:
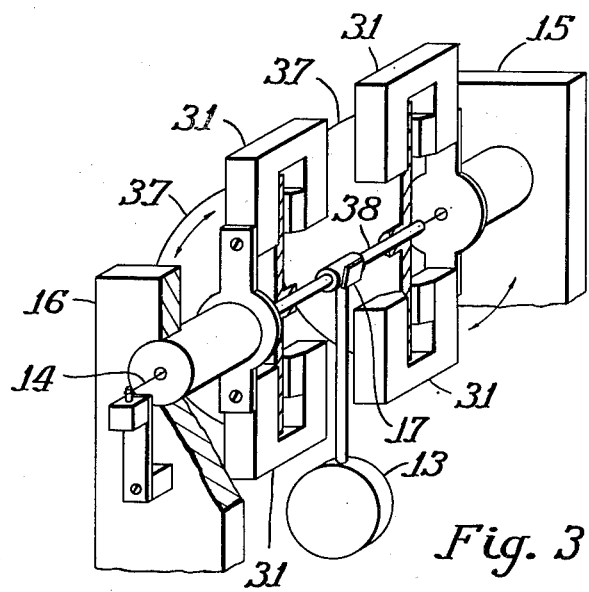
Figure 3 is an oblique view of an alternative embodiment of a dynamic pendulum damping means.

In Figure 3 I have shown an alternative embodiment in which the pendulum 13 and the disks 37 are separated. The pendulum 13 and the disks 37 are, however, rigidly mounted on the same axle 38 which may be suspended on torsion fiber 14 or any other low friction pivot. The principle of operation of this embodiment is substantially the same as the principle of operation of the embodiment shown in Figure 2. Here again the high inertia members 31 are rotatably mounted on supports 15 and 16 so that any rotation of these supports about the center of rotation of the pendulum 13 will not tend to rotate the high inertia members. While two disks 37 are shown for symmetry in connection with this embodiment, it will be apparent to those skilled in the art that either disk may be used alone without departing from the spirit of this invention.

While I have described my invention with particular reference to an elevation meter application and with particular reference to electromagnetic damping means, it is to be understood that this invention is not to be limited to these embodiments, but it is only to be limited by the scope of the appended claims.

I claim:

1. In a gradiometer a dynamic damping apparatus for a pendulum suspended on torsion fibers between two supports comprising an electrical conducting plate associated with said pendulum, a balanced magnetic means including a magnet mounted to rotate freely on a pendulum support with the axis of rotation of said pendulum and said plate coincidental, said plate being disposed in the magnetic field of said magnet whereby eddy currents are induced into said plate to damp the oscillations of said pendulum, said magnet having an oblong pole piece, and said oblong pole piece being disposed with its longer axis perpendicular to the relative motion between said plate and said magnet.

2. In a leveling device employing an eddy current damped metallic disk pendulum suspended on torsion fibers between two supports as a reference to determine grade, the improvement comprising mounting at least one high inertia balanced magnetic structure to rotate freely on one of said pendulum supports, said pendulum and said structure rotating about the same axis and said structure being adapted to produce a magnetic field through said pendulum whereby high frequency oscillation of said pendulum support about said axis will not be transmitted by said structure to said pendulum.

3. In an elevation meter including a pendulum suspended on torsion fibers between two supports and on an axis approximately transverse to the average direction of travel of said structure, means for measuring predetermined increments of length in the path of travel of said structure, means for continuously multiplying together a quantity directly proportional to said increment of length times a quantity directly proportional to the sine of the angle of inclination of said path over said increment of length and for summing the results of said multiplication, and means to damp the high frequency oscillations of said pendulum, the improvement in said last named means comprising high inertia balanced magnets mounted to rotate freely on said supports whereby high frequency oscillation of said supports about said axis will not be transmitteted to said pendulum.

4. In a gradiometer a dynamic damping means for an electrical conducting disk pendulum suspended on torsion fibers between two supports comprising a high inertia magnetic means mounted on one of said supports and freely rotatable on the axis of rotation of said pendulum, said pendulum being disposed in the magnetic field of said high inertia magnetic means, whereby eddy currents are introduced in said pendulum to damp the oscillations thereof.

5. In a gradiometer employing a metallic disc pendulum suspended on torsion fibers between two supports as a reference to determine slope, a balanced, high-inertia, magnetic means rotatably mounted on one of said supports, the axis of rotation of said pendulum and said balanced, high-inertia, magnetic means being coincidental, and said metallic disc pendulum being disposed in the magnetic field of said high-inertia, magnetic means, whereby eddy currents are introduced into said metallic disc pendulum to damp high-frequency oscillations thereof and whereby said pendulum is free from frictional forces.

JOSEPH D. EISLER.

REFERENCES CITED

The following references are of record in the file of this patent:

UNITED STATES PATENTS

| Number | Name | Date |
|---|---|---|
| 502,433 | Gibboney | Aug. 1, 1893 |
| 681,835 | Soldana | Sept. 3, 1901 |
| 713,497 | Rowland | Nov. 11, 1902 |
| 767,372 | Arcioni | Aug. 16, 1904 |
| 1,290,685 | Townsley | Jan. 7, 1919 |
| 1,542,809 | Alexander et al. | June 23, 1925 |
| 1,552,487 | Johnston | Sept. 8, 1925 |
| 1,937,223 | Gattoni | Nov. 28, 1933 |
| 2,013,109 | Reynolds | Sept. 3, 1935 |
| 2,031,601 | Hegenberger | Feb. 25, 1936 |
| 2,168,290 | Green | Aug. 1, 1939 |
| 2,320,290 | McNatt | May 25, 1943 |
| 2,362,616 | Cloud | Nov. 14, 1944 |
| 2,366,995 | Aulin | Jan. 9, 1945 |
| 2,373,262 | Rogowski | Apr. 10, 1945 |